United States Patent
Weimer et al.

[11] Patent Number: 5,263,816
[45] Date of Patent: Nov. 23, 1993

[54] TURBOMACHINE WITH ACTIVE TIP CLEARANCE CONTROL

[75] Inventors: Matthew M. Weimer; Steven A. Klusman, both of Indianapolis, Ind.

[73] Assignee: General Motors Corporation, Detroit, Mich.

[21] Appl. No.: 901,655

[22] Filed: Jun. 22, 1992

Related U.S. Application Data

[63] Continuation-in-part of Ser. No. 752,365, Sep. 3, 1991, abandoned.

[51] Int. Cl.$^5$ .................... F01D 5/02; F04D 17/10
[52] U.S. Cl. .................... 415/131; 415/14; 415/173.1
[58] Field of Search .............. 415/14, 129, 131, 132, 415/170.1, 173.1, 173.2, 174.1

[56] References Cited

U.S. PATENT DOCUMENTS

| | | |
|---|---|---|
| 1,823,310 | 9/1931 | Allen . |
| 3,045,894 | 7/1962 | Ross . |
| 3,329,095 | 7/1967 | Bartels . |
| 3,407,740 | 10/1968 | Samerdyke . |
| 4,264,271 | 4/1981 | Libertini . |
| 4,330,234 | 5/1982 | Colley . |
| 4,332,523 | 6/1982 | Smith . |
| 4,384,819 | 5/1983 | Baker . |
| 4,418,537 | 12/1983 | Iwamoto et al. . |
| 4,523,896 | 6/1985 | Lhenry et al. ............. 415/174.1 |
| 4,657,479 | 4/1987 | Brown et al. . |
| 4,683,716 | 8/1987 | Wright et al. . |

FOREIGN PATENT DOCUMENTS

| | | | |
|---|---|---|---|
| 966306 | 10/1982 | U.S.S.R. ............. | 415/174.1 |

Primary Examiner—Edward K. Look
Assistant Examiner—James A. Larson
Attorney, Agent, or Firm—Saul Schwartz

[57] ABSTRACT

A turbomachine including a case, a rotor, a plurality of rotor blades on the rotor each having a blade tip, a shroud around the rotor blade tips, and bearings mounting the rotor on the case for rotation about a centerline of the case and for bodily shiftable movement in the direction of the centerline. The rotor blade tips and an inside wall of the shroud flare radially outward in the direction of the centerline so that when the rotor moves in the direction of the centerline toward the shroud a clearance gap between the blade tips and the inner wall of the shroud decreases and vice versa. An electromagnetic actuator on the case magnetically attracts a thrust plate on the rotor against a net dynamic force on the rotor. A control system of the actuator controls the magnetic attraction of the actuator in response to signals from a position sensor measuring the actual magnitude of the clearance gap to maintain the actual clearance gap at a predetermined magnitude.

2 Claims, 2 Drawing Sheets

TURBOMACHINE WITH ACTIVE TIP CLEARANCE CONTROL

This application is a continuation-in-part of application Ser. No. 07/752,365 filed Sep. 3, 1991, abandoned.

FIELD OF THE INVENTION

This invention relates to tip clearance control in gas turbine engines.

BACKGROUND OF THE INVENTION

Minimizing leakage around the tips of compressor and/or turbine blades in gas turbine engines or other turbomachines improves efficiency. In most prior active tip clearance control proposals, a shroud or surface thereof is moved toward and away from blade tips during engine operation to maintain predetermined tip clearance. For example, many prior proposals include a thermally responsive shroud around blade tips which shroud expands and contracts in accordance with selective exposure to hot gas behind the shroud. In another proposal, the inside diameter of a segmented shroud is controlled by balancing high pressure air in a chamber behind the shroud against normal gas pressure on the opposite side of the shroud in a gas flow path of the turbomachine. In still other proposals, mechanical linkages and eccentrics bodily shift annular shrouds longitudinally toward and away from the blade tips. And in yet another proposal, a shroud wall of a radial flow compressor is connected to a static support through a flexible diaphragm which distorts under thermal and pressure loading to effect movement of the shroud wall. A gas turbine engine or turbomachine according to this invention includes novel, active tip clearance control apparatus.

SUMMARY OF THE INVENTION

This invention is a new improved turbomachine having a case, a shroud rigidly supported on the case, and a rotor supported on the case for rotation about a centerline of the case and for bodily shiftable movement in the direction of the centerline. The rotor has a plurality of blades thereon the tips of which flare radially outward. The shroud has an outwardly flared inner wall facing the blade tips and the gas flow path of the turbomachine so that bodily shiftable movement of the rotor toward the shroud decreases the clearance between the blade tips and the inner wall of the shroud. During operation of the turbomachine, a net dynamic force on the rotor continuously urges the rotor in the direction corresponding to minimum clearance between the blade tips and the shroud. An actuator on the case includes an electromagnet and a control system for modulating the magnetic attraction of the electromagnet on a thrust plate rigidly attached to the rotor. The magnetic attraction of the actuator is opposite the net dynamic force on the rotor. The control system includes position sensors on the case which provide signals corresponding to the instantaneous clearance between the blade tips and the shroud. The control system modulates the magnetic attraction of the actuator in response to the signals from the position sensors to maintain a substantially constant clearance between the shroud and the blade tips.

DESCRIPTION OF PREFERRED EMBODIMENTS

Figure 1:
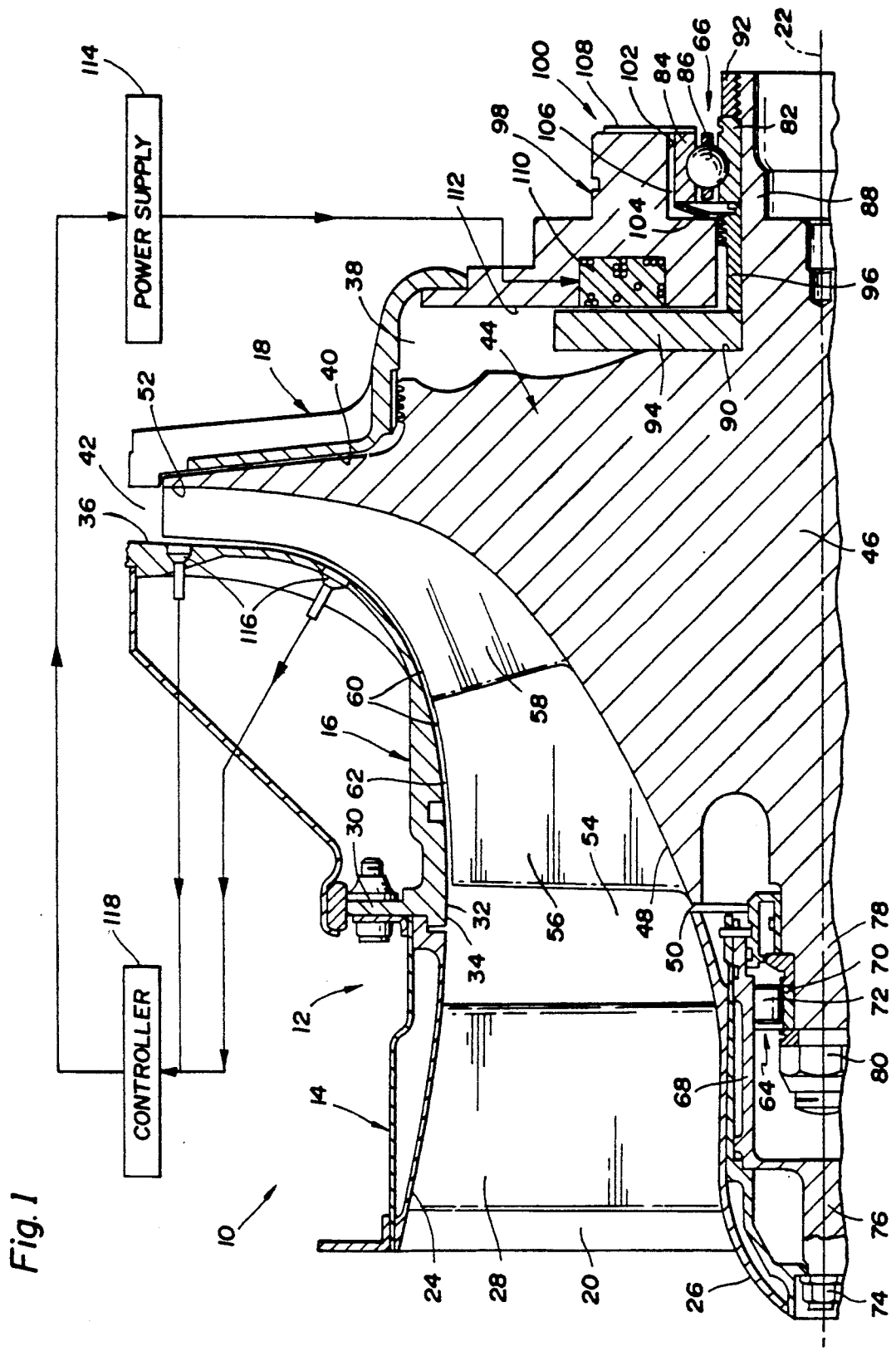
FIG. 1 is a fragmentary longitudinal sectional view of a radial flow turbomachine according to this.

Referring to FIG. 1, a turbomachine in the form of a radial flow compressor (10) includes a case (12) having a front frame (14), a shroud (16), and a back plate (18), all rigidly connected together. An annular air inlet (20) of the compressor, symmetric about a longitudinal centerline (22) of the case, is defined between an outer wall (24) of the front frame and an inner dome (26) of the front frame. A plurality of radial struts support the inner dome (26) relative to the outer wall (24) and define guide vanes in the air inlet (20), only a single strut (28) being visible in FIG. 1.

The shroud (16) has a flange (30) for attachment to the front frame (14) and an inner wall (32) which flares radially outward from a circular forward edge (34) to an outer circumferential edge (36). The back plate (18) of the case is symmetric about the centerline (22) and is spaced axially from the shroud (16) so that a rotor chamber (38) is defined between the inner wall (32) of the shroud and an inner surface (40) of the back plate. An annular discharge (42) from the rotor chamber is defined between the circumferential edge (36) and the inner surface (40) of the back plate and may be surrounded by a diffuser, not shown, and a scroll chamber.

A rotor (44) of the compressor (10) is aligned on the centerline (22) in the rotor chamber (38) and includes a hub (46) having an outer wall (48) facing the inner wall (32) of the shroud and flaring radially outward from a front edge (50) of the rotor to a circumferentially outer edge (52) of the rotor. The outer wall (48) and the inner wall (32) cooperate in defining therebetween an annular, outwardly flaring gas flow path (54) extending from the inlet (20) to the discharge (42). A plurality of integral full blades and integral splitter blades of the rotor are disposed in the gas flow path (54), only a single full blade (56) and a single splitter blade (58) being visible in FIG. 1. Each of the blades (56–58) has an outwardly flaring tip (60) spaced from the inner wall by a clearance or gap (62) illustrated in exaggerated fashion for clarity in FIG. 1.

The rotor (44) is supported on the front frame (14) by a front bearing assembly (64) and on the back plate (18) by an aft bearing assembly (66) for rotation about the centerline (22) and for bodily shiftable movement in the direction of the centerline. The front bearing assembly (64) includes a cup-shaped outer race (68), an annular inner race (70), and a plurality of rollers (72) therebetween. The outer race (68) is clamped to the dome (26) by a nut (74) on a stem (76) of the outer race. The inner race is clamped on a cylindrical front extension (78) of the rotor (44) by a nut (80). In the direction of centerline (22), the rollers (72) are effectively unrestrained for small excursions of on the order of 0.030 inch. Therefore, the rollers (72) also support the front extension (78) on the dome (26) for small excursions of bodily shiftable movement in the direction of the centerline (22).

The aft bearing assembly (66) includes an inner race (82), an outer race (84) and a plurality of antifriction bearing balls (86) therebetween. The bearing balls seat in grooves in the inner and outer races and, accordingly, prevent relative movement between the races in the direction of centerline (22). The inner race is clamped on an aft extension (88) of the rotor (44) against a shoulder (90) on the hub (46) by a nut (92) with an annular thrust plate (94) and a tubular spacer (96) disposed on the aft extension between the shoulder (90) and the inner race. The thrust plate (94) is made of ferromagnetic material. The aft extension (88) may be adapted for connection to a turbine shaft, not shown, for driving the rotor.

An annular housing (98) of an electromagnetic actuator (100) is rigidly connected to the back plate (18) and, consequently, to the case (12) and includes a counterbore (102) aligned on the centerline (22). The outer race (84) of the aft bearing assembly (66) is disposed in the counterbore (102) with a spring washer (104) between the outer race and the bottom of the counterbore and with a squeeze film damping chamber defined in an annular clearance (106), illustrated in exaggerated fashion for clarity in FIG. 1, around the outer race.

The annular clearance (106) permits relative movement between the actuator housing (98) on the one hand and the aft bearing assembly (66) and the rotor (44) on the other hand in the direction of the centerline (22). A retainer (108) on the actuator housing (98) limits movement of the outer race (84) to the right, FIG. 1, under the influence of the spring washer (104) and, therefore, defines a retracted position of the rotor (44) relative to the shroud (16). In the retracted position of the rotor, the gap (62) between the blade tips (60) and the inner wall (32) of the shroud assumes a maximum dimension of on the order of 0.015 inch.

The actuator (100) further includes an annular electromagnet (110) on the housing (98) flush with a side (112) thereof facing the thrust plate (94). The electromagnet includes a metal core and a wire coil connected to a power supply (114). When the electromagnet (110) is turned on, the power supply induces a current in the coil which produces a magnetic flux field which, in turn, intercepts the ferromagnetic thrust plate (94) and attracts the thrust plate and, consequently, the rotor (44) to the right toward the side (112) of the housing (98).

The magnetic attraction of the actuator (100) is variable in accordance with the current flow through the coil of the electromagnet (110). A control system of the actuator (100) for modulating the power supply (114) and the magnetic attraction of the electromagnet includes a plurality of position sensors (116) on the shroud and a programmable controller (118) connected to the sensors and to the power supply (114) for modulating the latter in response to signals from the sensors.

When the compressor is operating, a net dynamic force on the rotor (44) urges the rotor to the left so that the blade tips (60) are urged toward the inner wall (32) of the shroud. The net dynamic force is the result of migration of high pressure air from the discharge (42) to the space behind the rotor and urges the rotor to an innermost position, not shown, achieved when the washer (104) is flattened between the bottom of the counterbore (102) and the outer race (84) of the bearing assembly (66). Clearance between the blade tips and the shroud is minimum in the innermost position of the rotor. The spring washer (104) also acts to keep the bearing (86) loaded in the same direction regardless of the magnetic attraction on the thrust plate.

To control the magnitude of the gap (62), the sensors (116) provide signals to the programmable controller (118) characteristic of the instantaneous or real time magnitude of the gap (62). The controller compares the real time magnitude of the gap with a schedule of magnitudes calculated to maximize the efficiency of the compressor. Based on the comparison, the controller modulates the power supply (114) to increase or decrease the magnetic attraction of the electromagnet (110) on the thrust plate (94) to effect bodily shiftable movement of the rotor (44) toward or away from the inside wall (32) of the shroud (16).

Figure 2:
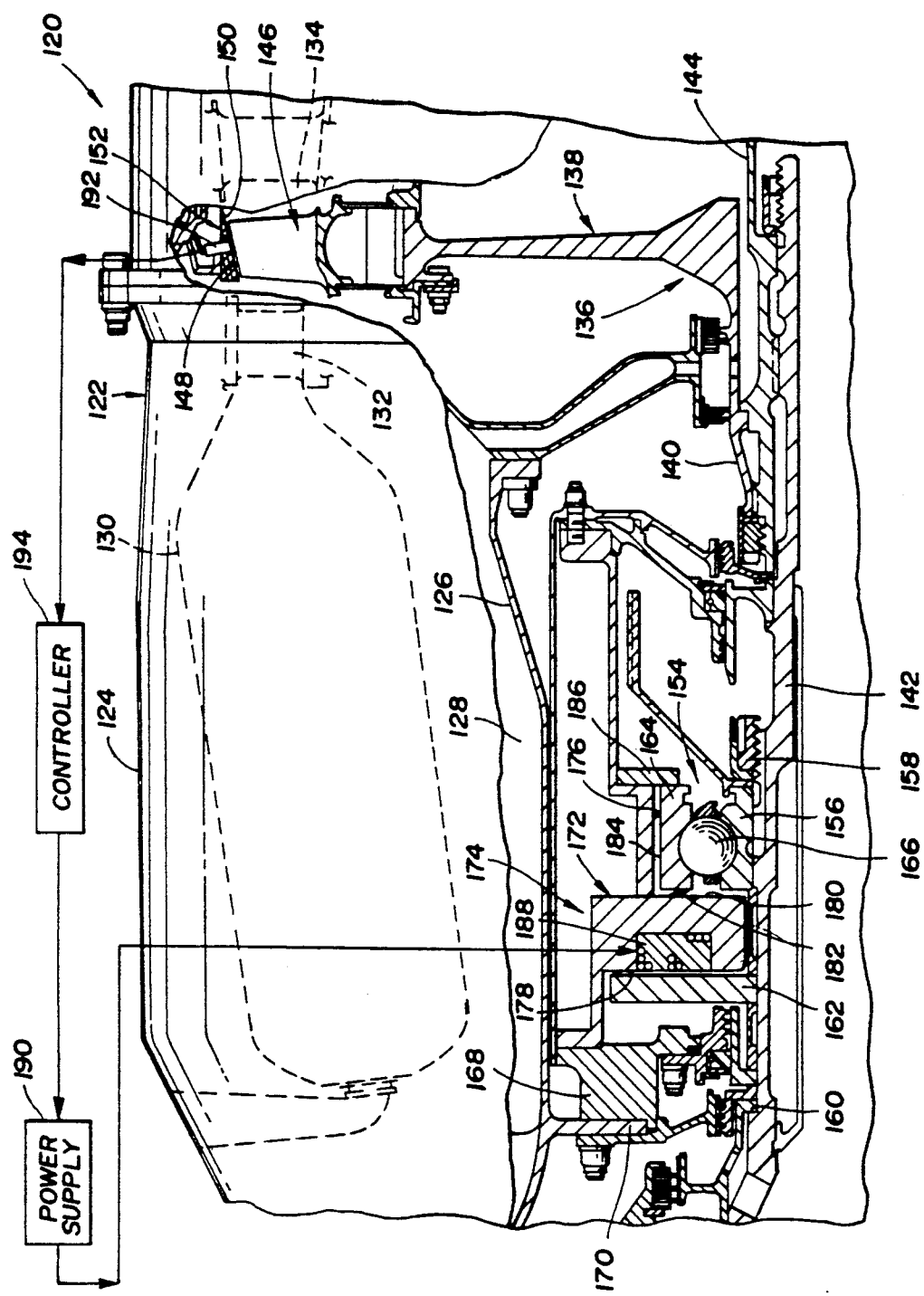
FIG. 2 is a fragmentary longitudinal sectional view of an axial flow turbomachine according to this invention.

Referring to FIG. 2, a turbomachine in the form of a fragmentarily illustrated axial flow gas turbine engine (120) includes a case (122) having an outer wall (124) and an inner wall (126) which define therebetween an annular compressed air plenum (128). An annular combustor (130) in the compressed air plenum produces a continuous stream of hot gas which discharges from the combustor through a stationary nozzle ring (132). The nozzle ring (132) defines an upstream end of an annular gas flow path (134) of the engine.

A turbine rotor (136) of the engine (120) includes a turbine wheel (138) having a cylindrical hub (140) connected to a tubular rotor shaft (142) for rotation as a unit with the shaft about a longitudinal centerline, not shown, of the engine. A fragmentarily illustrated cylindrical hub (144) of a second turbine wheel is similarly rigidly connected to the rotor shaft. The turbine wheel (138) has a circumferential array of turbine blades thereon in the gas flow path (134), only a representative blade (146) being visible in FIG. 2. The turbine blades each have a radially outwardly flaring blade tip (148) thereon in close proximity to a radially outwardly flaring inner wall (150) of an annular shroud (152) rigidly supported on the case (122).

A bearing assembly (154) of the engine (120) includes an inner race (156) on the rotor shaft (142) clamped by a nut (158) against a shoulder (160) of the rotor shaft with an annular thrust plate (162) and additional seal runners and spacers between the inner race and the shoulder. The thrust plate (162) is made of ferromagnetic material. An outer race (164) of the bearing assembly (154) is disposed around the inner race (156) with a plurality of anti-friction bearing balls (166) therebetween. The bearing balls seat in grooves in the races and, accordingly, prevent relative bodily shiftable movement between the inner and outer races in the direction of the longitudinal centerline of the engine.

An annular support (168) is bolted to a flange (170) integral with the inner wall (126) of the engine case. An annular actuator housing (172) of an electromagnetic actuator (174) is rigidly connected to the support (168) and includes an inside cylindrical wall (176) aligned on the longitudinal centerline of the engine, an annular surface (178) facing the thrust plate (162), and an annular shoulder (180) at an inboard end of the cylindrical wall (176).

The outer race (164) of the bearing assembly (154) is disposed in the cylindrical wall (176) with a spring washer (182) between the outer race and the annular shoulder (180) on the housing (172). A squeeze film damping chamber is defined in an annular clearance (184), illustrated in exaggerated fashion for clarity in FIG. 2, around the outer race. The annular clearance (184) permits relative movement between the actuator housing (172) on the one hand and the bearing assembly (154) and the rotor (136) on the other hand in the direction of the longitudinal centerline of the engine.

A retainer (186) on the actuator housing (172) limits movement of the outer race (164) to the right, FIG. 2, under the influence of the spring washer (182) and, therefore, defines a retracted position of the rotor (136)

relative to the shroud (152). In the retracted position of the rotor, the gap between the blade tips (148) and the inner wall (150) of the shroud assumes a maximum dimension of on the order of 0.030 inch.

The actuator (174) further includes an annular electromagnet (188) on the housing (172) flush with the side (178) thereof facing the thrust plate (162). The electromagnet includes a metal core and a wire coil connected to a power supply (190). When the electromagnet (188) is turned on, the power supply incduces a current in the coil which produces a magnetic flux field which, in turn, intercepts the ferromagnetic thrust plate (162) and attracts the thrust plate and, consequently, the rotor (136) to the right toward the annular surface (178).

The magnetic attraction of the actuator (174) is variable in accordance with the current flow through the coil of the electromagnet (188). A control system of the actuator for modulating the power supply (190) and the magnetic attraction of the electromagnet (188) includes a plurality of position sensors (192) on the shroud (152) and a programmable controller (194) connected to the sensors and to the power supply for modulating the latter in response to signals from the sensors.

When the engine is operating, a net dynamic force on the rotor (136) urges the rotor to the left to an innermost position, not shown, achieved when the washer (182) is flattened between the annular shoulder (180) and the outer race (164) of the bearing assembly (154). Clearance between the blade tips and the shroud is minimum in the innermost position of the rotor. The net dynamic force of the rotor is due to dynamic forces on a compressor, not shown, of the engine (120) connected to the shaft (142). The spring washer (182) also acts to keep the bearing (154) loaded in the same direction regardless of the magnetic attraction on the thrust plane.

To control the magnitude of the gap between the blade tips (148) and the shroud wall (150) when the engine is operating, the sensors (192) provide signals to the programmable controller (194) characteristic of the instantaneous or real time magnitude of the gap. The controller compares the real time magnitude of the gap with a predetermined schedule of magnitudes. Based on the comparison, the controller modulates the power supply (190) to increase or decrease the magnetic attraction of the electromagnet (188) on the thrust plate (162) to effect bodily shiftable movement of the rotor (136) in the direction of the longitudinal centerline of the engine.

We claim:

1. A turbomachine comprising:
a case means having a longitudinal centerline,
an annular shroud rigidly attached to said case means having an inner wall defining a side of an annular gas flow path of said turbomachine arouna said longitudinal centerline flaring radially outward in the downstream direction of said gas flow path,
a rotor having a plurality of rotor blades thereon,
means mounting said rotor on said case means with said rotor blades in said gas flow path for rotation about said longitudinal centerline and for bodily shiftable movement in the direction of said longitudinal centerline in a first direction toward said shroud and in an opposite second direction away from said shroud including,
a bearing assembly having
an inner race rigidly attached to said rotor,
an outer race, and
a plurality of antifriction elements between said inner and said outer races permitting relative rotation between said inner and said outer races and preventing relative bodily shiftable movement between said inner and said outer races in the direction of said longitudinal centerline
said rotor being subjected to a net dynamic force in said first direction during operation of said turbomachine,
means on each of said rotor blades defining a blade tip flaring radially outward in the downstream direction of said gas flow path and cooperating with said inner wall of said shroud in defining a clearance gap therebetween decreasing in response to bodily shiftable movement of said rotor in said first direction and increasing in response to bodily shiftable movement of said rotor in said second direction,
a ferromagnetic thrust plate rigidly connected to said rotor,
an electromagnet means on said case means having a magnetic flux field when said electromagnet means is turned on which intercepts said thrust plate and magnetically attracts said rotor in said second direction,
a spring means between said case means and said outer race of said bearing assembly biasing said bearing assembly and said rotor in said second direction and maintaining the direction of the net force on said bearing assembly in said second direction regardless of the magnetic attraction of said electromagnet means on said thrust plate,
position sensing means on said case means operative to generate an electrical signal during operation of said turbomachine corresponding to the instantaneous magnitude of said clearance gap between said rotor blade tips and said inner wall of said shroud, and
control means connected to said electromagnet means and to said position sensing means operative to modulate the magnetic attraction of said electromagnet means in response to said signals from said position sensing means to maintain a substantially constant clearance gap between said rotor blade tips and said inner wall of said shroud.

2. The turbomachine recited in claim 1 wherein said spring means includes:
an annular spring washer between said case means and said outer race of said bearing assembly having a flattened condition defining an innermost position of said rotor relative to said shroud in which said clearance gap between said rotor blade tips and said inner wall of said shroud is minimum.

* * * * *